United States Patent [19]

Baker

[11] Patent Number: 4,844,407
[45] Date of Patent: Jul. 4, 1989

[54] VALVE OVERRIDE MECHANISM
[75] Inventor: Gerald S. Baker, Houston, Tex.
[73] Assignee: Cameron Iron Works USA, Inc., Houston, Tex.
[21] Appl. No.: 205,352
[22] Filed: Jun. 10, 1988
[51] Int. Cl.[4] .......................................... F16K 31/143
[52] U.S. Cl. ...................................... 251/14; 251/63.6
[58] Field of Search ................. 251/14, 62, 63.4, 63.5, 251/63.6, 284

[56] References Cited
U.S. PATENT DOCUMENTS

| | | | |
|---|---|---|---|
| 2,733,041 | 1/1956 | Crookston | 251/14 |
| 3,402,912 | 9/1968 | Watkins | 251/14 |
| 3,417,960 | 12/1968 | Stehlin | 251/14 |
| 3,765,642 | 10/1973 | Nelson | 251/14 |
| 4,230,299 | 10/1980 | Pierce, Jr. | 251/14 |
| 4,436,279 | 3/1984 | Bonds et al. | 251/14 X |
| 4,650,151 | 3/1987 | McIntyre | 251/14 |

Primary Examiner—John Rivell

[57] ABSTRACT

An improved override structure for a valve having an override stem having T slot on its first end for connecting to the T shape of the valve member stem, an actuator threaded onto the override stem for moving the override stem axially to cause movement of the valve member between open and closed positions, pins and slots for preventing rotary movement of said actuator, an engaging member for receiving a handwheel on the other end of the override stem for imparting rotation to the override stem within the actuator, such rotation causing axial movement of the override and valve member stems to move the valve member without movement of the actuator.

2 Claims, 4 Drawing Sheets

VALVE OVERRIDE MECHANISM

BACKGROUND

The present invention relates to an improved mechanism for connection to an actuator for a valve or a choke which can be operated mechanically to cause the reversal of the position of the valve member.

U.S. Pat. No. 4,194,718 Baker et al is an example of the prior are of such override mechanisms as applied to a choke and which can be operated by a handwheel. It includes means for releasably connecting the manual operator to the gate to manually move the gate and for releasing the manual operator from the gate to allow such movement.

U.S. Pat. No. 3,378,224 to Boyle discloses a gate valve which is piston actuated together with a handwheel having a sleeve threaded on the shaft which extends through the piston. Rotation of the handwheel causes movement of both the piston and the valve member.

U.S. Pat. No. 4,189,980 discloses a manual control apparatus which has a split drive nut and a camming system which coacts with the rotation system for bringing the split drive nut into engagement with the threaded drive screw and rotating the split nut to move the drive screw and the valve member connected thereto.

U.S. Pat. No. 3,628,397 discloses a valve member having a ball nut secured to the upper portion of the piston and a ball shaft secured to the top of the bonnet and mounted so that its rotation causes movement of the piston and valve member. During normal operation, movement of the piston will cause rotation of the ball shaft.

U.S. Pat. No. 4,213,480 discloses an override mechanism for a valve in which a nut is threaded onto the drive stem and is engaged by a drive sleeve which telescopes onto the nut and splines connect the sleeve to the nut. Rotation of the sleeve rotates the nut which contacts one of the abutment surfaces and then causes movement of the gate.

SUMMARY

The improved override structure for a valve includes an override stem having means on its first end for connecting to the valve member stem, an actuator threaded onto the override stem for moving the override stem axially to cause movement of the valve member between open and closed positions, means for preventing rotary movement of said actuator, means on the other end of the override stem for imparting rotation to the override stem within the actuator, such rotation causing axial movement of the override and valve member stems to move the valve member without movement of the actuator. Anti-rotation pins are provided in said rotary preventing means and to prevent relative rotation between the rotation imparting means and the override stem.

An object of the present invention is to provide an improved override mechanism for a valve which is easy to operate.

Another object is to provide an improved override mechanism for a valve which may be used to operate the valve independent of the position and condition of the actuator.

A further object is to provide an improved valve with an override mechanism which does not interfere with normal valve operations and yet is simple to use to control the valve position.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
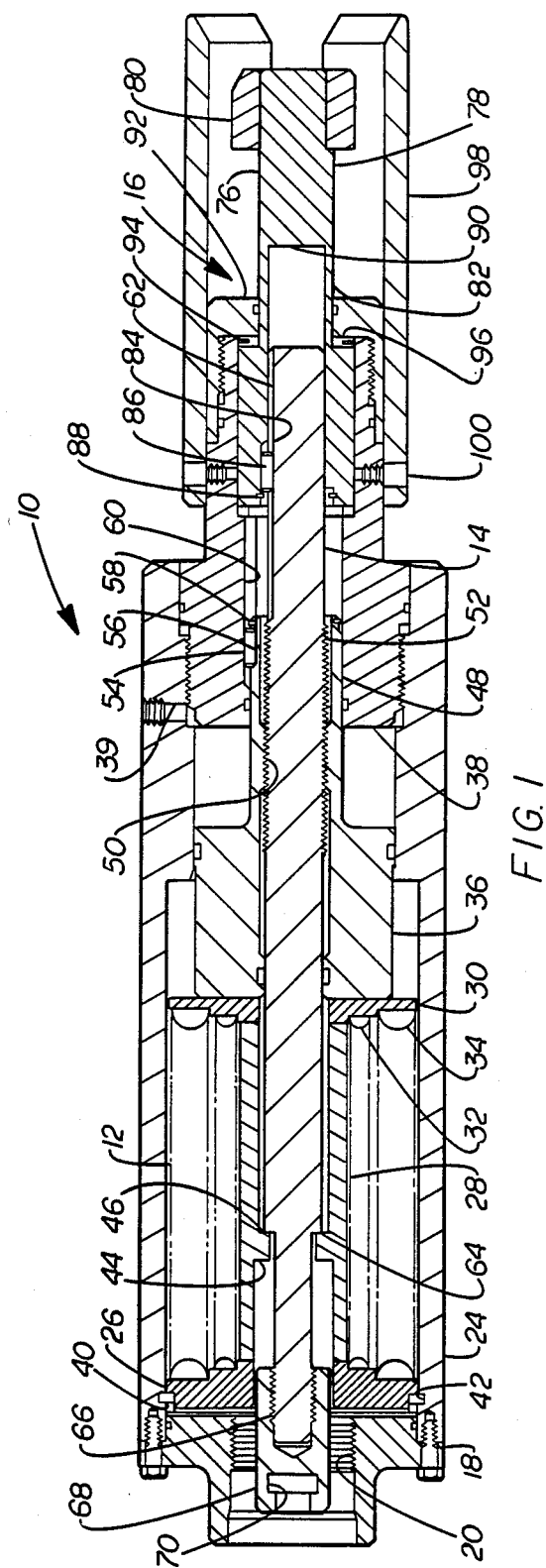
FIG. 1 is an axial sectional view of the improved override mechanism of the present invention which is in one position.
Figure 2:
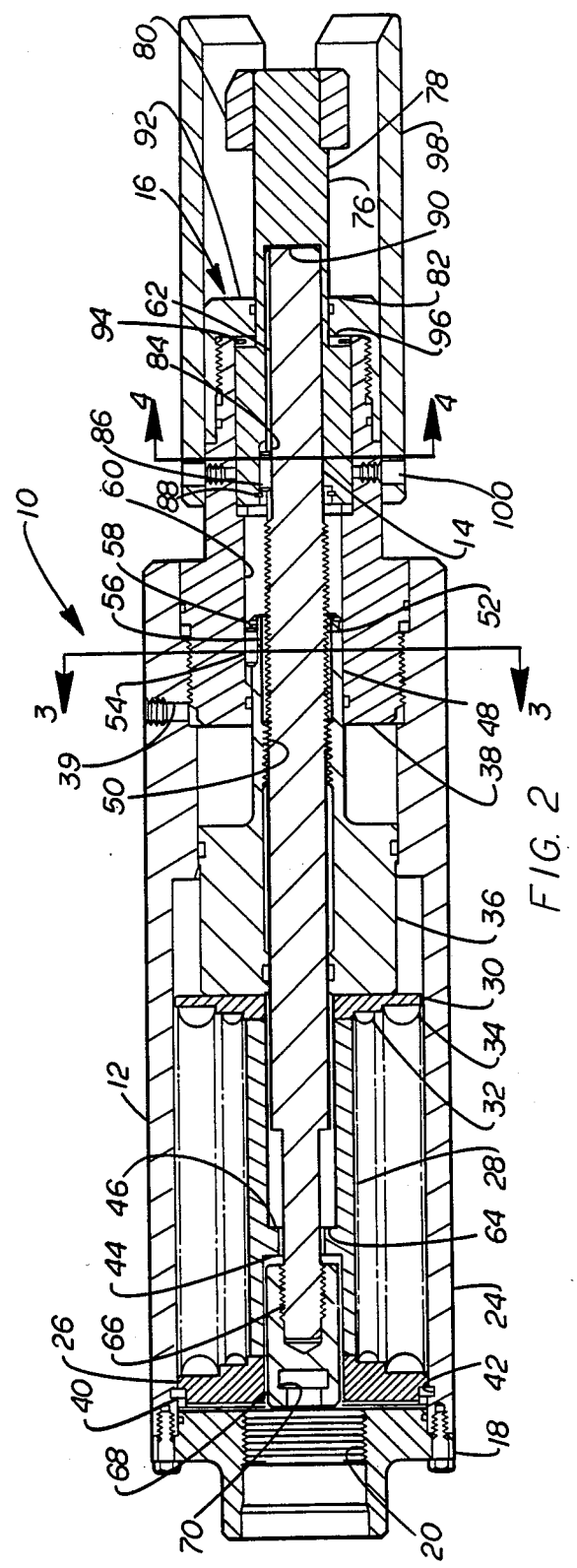
FIG. 2 is another axial sectional view of the override mechanism shown in FIG. 1 but with the mechanism in its opposite position to illustrate the axial movement which may be imparted to a valve member when the mechanism is operated independently of the actuator.
Figure 4:
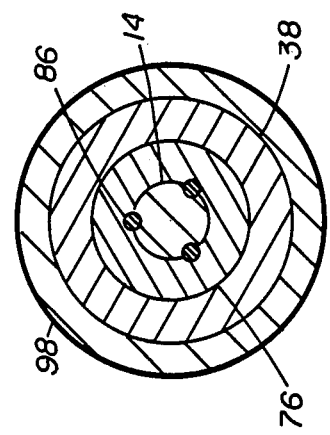
FIG. 4 is a sectional view of the anti-rotation pins between the drive sleeve surrounding the override stem and such stem.

Improved override mechanism 10 of the present invention is shown in FIGS. 1 and 2 in its two extreme positions. The components thereof are described with respect to their position as shown in FIG. 1 initially and then their change of position is described with respect to FIG. 2. Mechanism 10 includes actuator 12, override stem 14, mechanical driving means 16 and lower head 18 on which actuator is mounted and which includes internal threads 20 for connecting to a valve 22 as hereinafter described with respect to FIG. 5.

Figure 3:
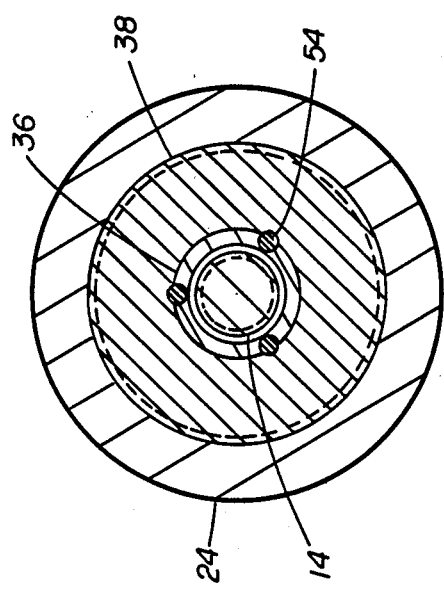
FIG. 3 is a sectional view of the anti-rotation pins used to prevent rotation of the actuator piston responsive to rotation of the stem.

Actuator 12 is shown to be a pressure responsive actuator but may be any other type of actuator such as a mechanical, electrical or other suitable type of actuator Actuator 12 includes cylinder sleeve 24 which is suitably secured and sealed to the lower head 18, lower annular spring plate 26, inner sleeve 28, upper annular spring plate 30, springs 32 and 34, piston 36 and upper head seal member 38 which is threaded into and sealed within the upper interior of sleeve 24. Port 39 extends through sleeve 24 into the annular space between the upper surface of piston 36 and the lower surface of head 38. Lower annular spring plate 26 is supported within sleeve 24 by snap ring 40 which is positioned within groove 42 on the interior of sleeve 24. The interior of inner sleeve 28 includes inward projection 44 forming upwardly facing shoulder 46. Upper annular spring plate 30 abuts against the lower end of piston 36 so that the force of springs 32 and 34 are exerted thereon to bias piston toward its upper position. Piston 36 includes annular upwardly extending sleeve 48 which includes internal threads 50 which are in engagement with threads 52 on the exterior of override stem 14. Anti-rotation pins 54 are secured partially within external axially extending slots 56 on sleeve 48 by snap ring 58 and partially within axially extending slots 60 on the interior of upper head seal member 38 to prevent rotation of piston 36 with the rotation of override stem 14. The relationship of pins 54 with respect to sleeve 48 and member 38 is best seen in FIG. 3.

Figure 5:
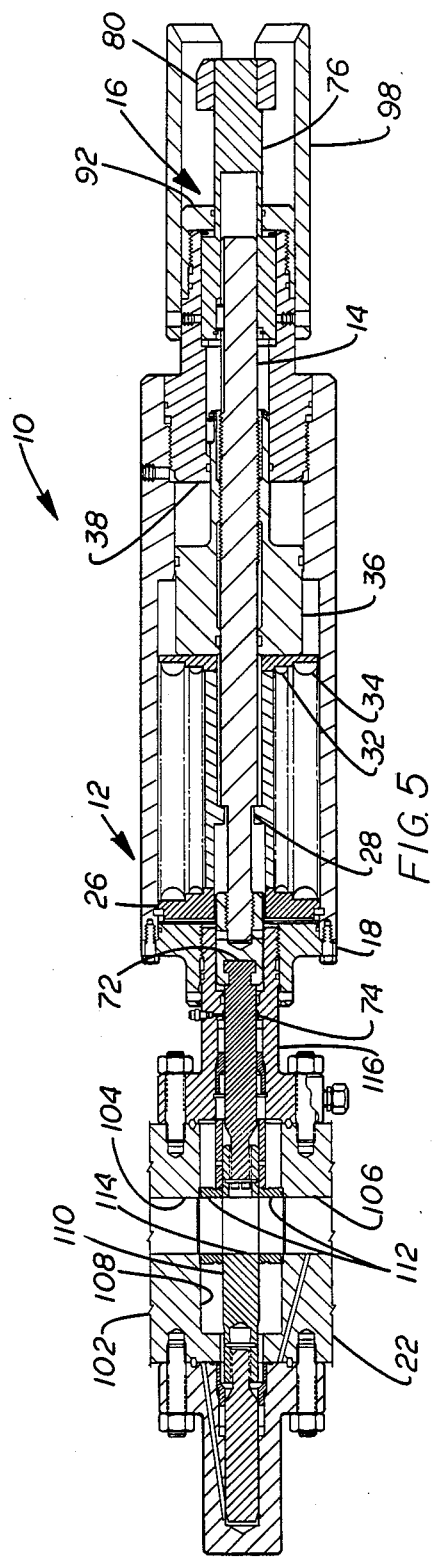
FIG. 5 is a sectional view of a valve having the improved override mechanism attached to and controlling the operation of the valve stem.

Override stem 14 includes threads 52 which engage within threads 50 on the interior of piston sleeve 48, upper axially extending slots 62, lower downwardly facing shoulder 64 and lower threads 66 which engage valve member coupler 68. Valve member coupler 68 includes lower transverse slot 70 in which a circular T-shaped projection 72 of valve member stem 74 engages to provide the connection between override stem 14 and valve member stem 74. Projection 72 and valve member stem 74 are seen in FIG. 5.

Mechanical driving means 16 includes driving member 76 having outer solid portion 78 on which suitable engaging means 80, such as a hex nut is engaged, and sleeve portion 82 which includes inner slots 84 in which anti-rotation pins 86 are positioned and held therein by snap ring 88 and upper stop surface 90 formed by solid portion 78 within sleeve portion 82. A handwheel or a remote operated vehicle is slipped into engagement with engaging means 80 and then driving means 16 is rotated. With reference to the outer end of stem 14, and presuming right hand thread engagement between stem 14 and piston sleeve 48, a counter clockwise rotation will cause stem 14 to thread upwardly through piston sleeve 48 to move valve member of valve 22 to its upper or other position without any movement of piston 36. This movement is stopped by the engagement of the outer end of stem 14 with stop surface 90. If the movement of stem is clockwise, then it will thread downwardly through piston sleeve 48 until stem shoulder 64 comes into engagement with inner sleeve shoulder 46. Cap 92 is threaded onto the outer end of upper head seal member 38 and has outer inwardly extending flange which closely surrounds the exterior of sleeve portion 82 of driving means 16. Suitable bearing means 94 is provided between the interior of cap 92 and outwardly facing shoulder 96 on sleeve portion 82 of driving means 16. Skirt 98 is secured to head member 38 by threaded pins 100 and extends outwardly in surrounding relationship to driving means 16 for protection thereof but spaced sufficiently radially outward from engaging means 80 to allow reasonable engagement thereof by a handwheel hub or a remotely operated tool (not shown).

Valve 22 includes body 102 having ports 104 and 106 defining the inlet and outlet of valve 22 and communicating with valve chamber 108 in which valve member or gate 110 is positioned between suitable sealing bushings 112 for movement so that its port 114 either registers with ports 104 and 106 to allow flow through valve 22 or is out or registry with ports 104 and 106 so that is blocked by valve 22. Bonnet 116 is secured to body 102 and threads into threads 20 on the interior of lower head 18. Valve member stem 74 is secured to gate 110 and includes T-shaped projection 72 which engages within slot 70 in valve coupler member 68.

During normal operations, actuator 12 functions responsive to pressure fluid and spring force to move gate 110 to its desired position at all times. If at anytime actuator 12 fails to function properly a handwheel or a suitable tool of a remote operated vehicle (for underwater applications) can be engaged with engaging means 80 and then the proper rotation of driving means 16 will rotate override stem 14 to cause gate 110 to move within valve body 102 to its desired position. The engagement of the outer end of stem 14 with stop surface 90 provides the indication that gate 110 has completed its movement in one direction and the engagement of stem shoulder 64 with shoulder 46 on inner sleeve 28 provides the indication that gate 110 has completed its movement in the opposite direction. It is noted that this mechanism is easy to operate and provides a positive movement of the valve member even under conditions in which the actuator piston has become locked in its position. This mechanism is easy to operate under water as a diver can readily attach a handwheel and rotate it to change the valve position or an ROV may engage and operate the mechanism easily and quickly.

What is claimed is:

1. A valve comprising
a body having inlet, outlet, a valve chamber in communication with the inlet and the outlet,
a valve member positioned in said valve chamber for moving therein to open and close flow between said inlet and said outlet,
an actuator having a moving portion and a non-moving portion,
a stem connecting from said valve member to said moving portion of said actuator,
the connection between said stem and said moving portion of said actuator being a threaded connection,
means for preventing rotation of the moving portion of said actuator,
driving means connected to the outer end of said stem for rotating said stem,
rotation of said stem within said moving portion of said actutator causing axial movement of said stem and said valve member,
said rotation preventing means including
facing slots in said moving portion and said non-moving portion of said actuator, and
a pin positioned partially in each of the slots of said moving portion and partially in the facing slots of said non-moving portion to allow axial movement of said moving portion and prevent rotation of said moving portion of said actuator,
said actuator is a pressure responsive actuator and said moving means is a piston through which said stem is threaded,
stop means limiting the axial movement of said stem responsive to rotation thereof,
said stop means including
a shoulder on said stem,
an internal shoulder on said actuator,
said stem shoulder adapted to engage said internal actuator shoulder at the desired end of its axial movement responsive to rotation in one direction,
a stop surface on said driving means, and
means connecting said driving means to said non-moving portion of said actuator,
the end of said stem engaging said stop surface on said driving means at the desired end of its axial movement responsive to rotation in a direction opposite to said one direction.

2. A valve override mechanism for a valve including
a pressure responsive actuator having a piston,
an override stem having means for connecting to a valve member stem,
a driving means for rotating the override stem,
said override stem being in threaded engagement through the piston of said actuator, and
means for preventing rotation of the piston of said actuator whereby rotation of said override stem by said driving means threads said stem through said piston of said actuator and moves the connection to the valve member stem, means providing a stop to the axial movement of said override stem responsive to its rotation,
a pair of stops for engaging with said override stem to limit the axial movement thereof responsive to its rotation,
said rotation preventing means includes
said actuator having a non-rotating head,
at least one anti-rotation pin position in facing slots in the piston and the non-rotating head of the actuator to prevent rotation of the piston of the actuator,
a shoulder on said stem,
an internal shoulder on said actuator,
said stem shoulder adapted to engage said internal actuator shoulder at the desired end of its axial movement responsive to rotation in one direction,
a stop surface on said driving means, and
means connecting said driving means to said non-moving portion of said actuator,
the end of said stem engaging said stop surface on said driving means at the desired end of its axial movement responsive to rotation in a direction opposite to said one direction,
rotation of said stem within said piston causing axial movement of said stem.

* * * * *